US009693201B2

(12) United States Patent
Saunders

(10) Patent No.: US 9,693,201 B2
(45) Date of Patent: Jun. 27, 2017

(54) METHOD AND APPARATUS FOR GENERATING LOCATION REFERENCE INFORMATION

(71) Applicant: NAVTEQ B.V., Veldhoven (NL)

(72) Inventor: Mark Saunders, Naperville, IL (US)

(73) Assignee: HERE GLOBAL B.V., Veldhoven (NL)

( * ) Notice: Subject to any disclaimer, the term of this patent is extended or adjusted under 35 U.S.C. 154(b) by 639 days.

(21) Appl. No.: 13/690,902

(22) Filed: Nov. 30, 2012

(65) Prior Publication Data

US 2014/0155083 A1 Jun. 5, 2014

(51) Int. Cl.
*H04W 24/00* (2009.01)
*H04W 4/02* (2009.01)
*G06F 17/30* (2006.01)

(52) U.S. Cl.
CPC ...... *H04W 4/028* (2013.01); *G06F 17/30241* (2013.01)

(58) Field of Classification Search
None
See application file for complete search history.

(56) References Cited

U.S. PATENT DOCUMENTS

| 2005/0259606 | A1* | 11/2005 | Shutter et al. | 370/317 |
| 2006/0058950 | A1 | 3/2006 | Kato et al. | |
| 2010/0198505 | A1* | 8/2010 | Painter et al. | 701/207 |
| 2011/0238735 | A1 | 9/2011 | Gharpure et al. | |

OTHER PUBLICATIONS

Office Action for corresponding European Patent Application No. 13188405.8-1952, dated Aug. 22, 2016, 11 Pages.

* cited by examiner

*Primary Examiner* — Suhail Khan
(74) *Attorney, Agent, or Firm* — Ditthavong & Steiner, P.C.

(57) ABSTRACT

An approach for enabling the generation of a location record at a device based on a location not associated with a pre-stored location record is described. A location reference platform determines at least one location is not associated with one or more pre-stored location records at at least one device. The location reference platform also causes, at least in part, a generation of at least one location record for the at least one location. The location reference platform further causes, at least in part, a transmission of the at least one location record to the at least one device for storage with the one or more pre-stored location records.

21 Claims, 9 Drawing Sheets

| TABLE | LOCATION CODE | (SUB) TYPE | ROAD # | FIRST NAME | AREA REF | LINEAR REF | NEGATIVE O | POSITIVE O | LATITUDE | LONGITUDE |
|---|---|---|---|---|---|---|---|---|---|---|
| 01 | 04244 | P1.1 | I-85 | I-75/EXIT 85 | 00009 | 00075 | | 04245 | 33.78973 | -84.39083 |
| 01 | 04254 | P1.1 | I-85 | I-285/EXIT 95 | 00009 | 00075 | 04253 | 04255 | 33.88614 | -84.26692 |
| 01 | 04266 | P1.1 | I-85 | I-985/LANIER PKY/EXIT 113 | 00009 | 00075 | 04265 | 04267 | 34.04306 | -84.03137 |
| 01 | 04299 | P1.1 | I-285 | I-85/I-285 WEST SPLIT/EXIT 44 | 00009 | 00076 | 04300 | 04354 | 33.62456 | -84.48852 |
| 01 | 04XXX | P1.1 | I-285 | I-285/I-285 WEST SPLIT /EXIT XX | 000XX | 000XX | 043XX | 043XX | 35.62XXX | -83.48XXX |

100

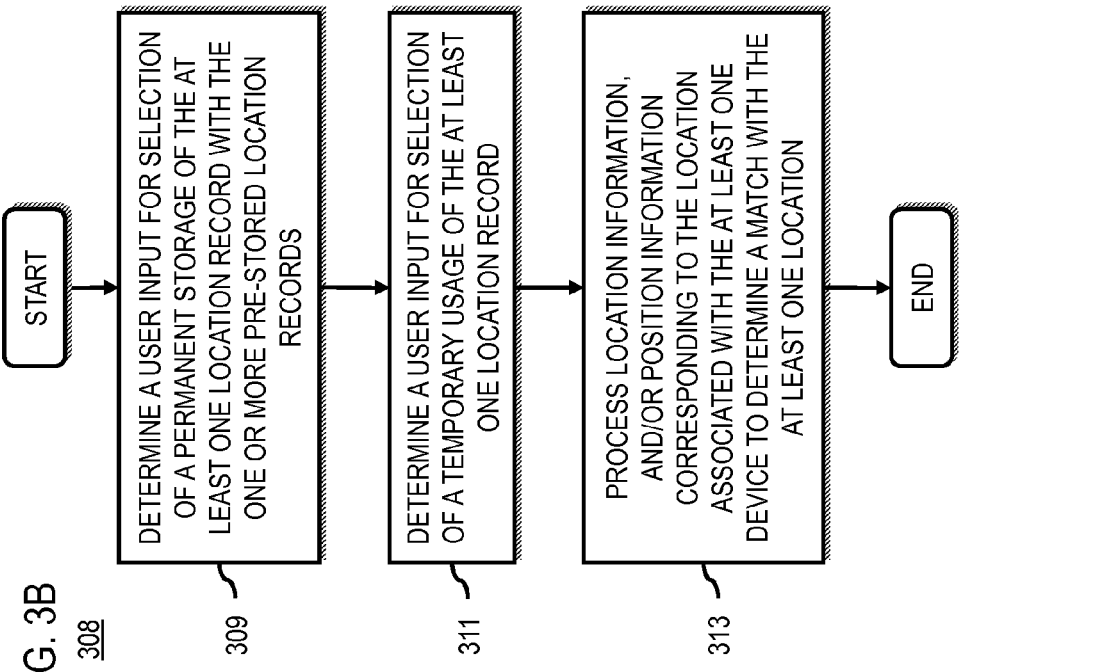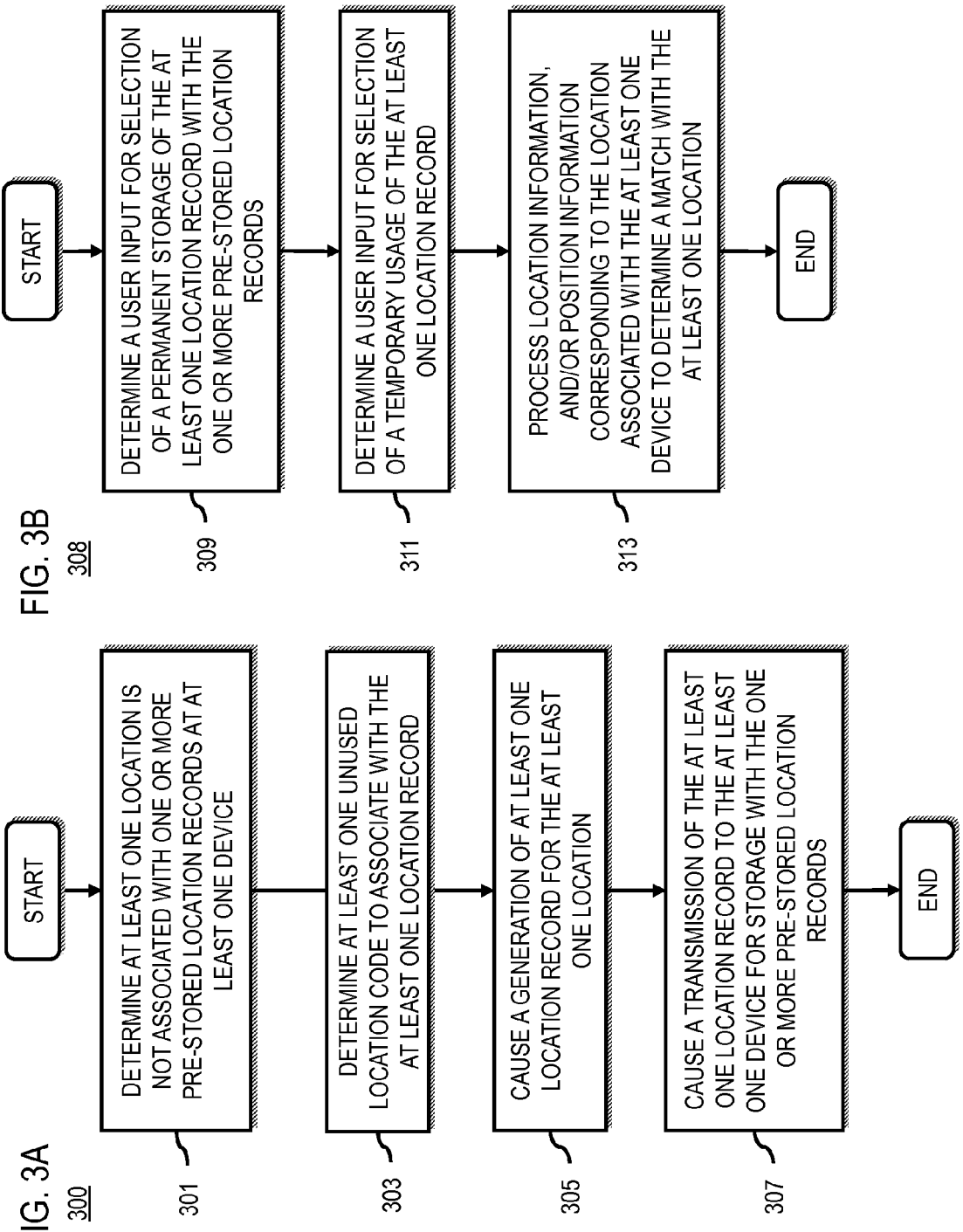

FIG. 4B

| TABLE | LOCATION CODE | (SUB) TYPE | ROAD # | FIRST NAME | AREA REF | LINEAR REF | NEGATIVE O | POSITIVE O | LATITUDE | LONGITUDE |
|---|---|---|---|---|---|---|---|---|---|---|
| 01 | 04244 | P1.1 | I-85 | I-75/EXIT 85 | 00009 | 00075 |  | 04245 | 33.78973 | -84.39083 |
| 01 | 04254 | P1.1 | I-85 | I-285/EXIT 95 | 00009 | 00075 | 04253 | 04255 | 33.88614 | -84.26692 |
| 01 | 04266 | P1.1 | I-85 | I-985/LANIER PKY/EXIT 113 | 00009 | 00075 | 04265 | 04267 | 34.04306 | -84.03137 |
| 01 | 04299 | P1.1 | I-285 | I-85/I-285 WEST SPLIT/EXIT 44 | 00009 | 00076 | 04300 | 04354 | 33.62456 | -84.48852 |
| 01 | 04XXX | P1.1 | I-285 | I-285/I-285 WEST SPLIT /EXIT XX | 000XX | 000XX | 043XX | 043XX | 35.62XXX | -83.48XXX |

METHOD AND APPARATUS FOR GENERATING LOCATION REFERENCE INFORMATION

BACKGROUND

Many navigation applications, radio-broadcast systems (e.g., HD radio) and other tools are configured to receive and present traffic information, route information, travel related event information and other location-based data to enhance the navigation experience. For example, a radio receiver device may present digital content pertaining to a nearby traffic incident occurring along a stretch of road the listener is traveling. Under this scenario, the digital content corresponding to the location-based data is presented via a display of the radio receiver in conjunction with the radio broadcast. To interpret the location based data, which is typically received according to a specific data format, the radio receiver must be preloaded with one or more location records. The location records further specify one or more location codes that identify the location corresponding to the traffic incident. Unfortunately, there is currently no convenient means of enabling a receiving device to identify location-based data regarding locations that are not already associated with a location code.

SOME EXAMPLE EMBODIMENTS

Therefore, there is a need for enabling the generation of a location record at a device based on a location not associated with a pre-stored location record.

According to one embodiment, a method comprises determining at least one location is not associated with one or more pre-stored location records at at least one device. The method also comprises causing, at least in part, a generation of at least one location record for the at least one location, wherein the at least one location record includes at least in part a location code and geo-position information associated with the at least one location. The method further comprises causing, at least in part, a transmission of the at least one location record to the at least one device for storage with the one or more pre-stored location records.

According to another embodiment, an apparatus comprises at least one processor, and at least one memory including computer program code for one or more computer programs, the at least one memory and the computer program code configured to, with the at least one processor, cause, at least in part, the apparatus to determine at least one location is not associated with one or more pre-stored location records at at least one device. The apparatus is also caused to generate at least one location record for the at least one location, wherein the at least one location record includes at least in part a location code and geo-position information associated with the at least one location. The apparatus is further caused to transmit the at least one location record to the at least one device for storage with the one or more pre-stored location records.

According to another embodiment, a computer-readable storage medium carries one or more sequences of one or more instructions which, when executed by one or more processors, cause, at least in part, an apparatus to determine at least one location is not associated with one or more pre-stored location records at at least one device. The apparatus is also caused to generate at least one location record for the at least one location, wherein the at least one location record includes at least in part a location code and geo-position information associated with the at least one location. The apparatus is further caused to transmit the at least one location record to the at least one device for storage with the one or more pre-stored location records.

According to another embodiment, an apparatus comprises means for determining at least one location is not associated with one or more pre-stored location records at at least one device. The apparatus also comprises means for causing, at least in part, a generation of at least one location record for the at least one location, wherein the at least one location record includes at least in part a location code and geo-position information associated with the at least one location. The apparatus further comprises means for causing, at least in part, a transmission of the at least one location record to the at least one device for storage with the one or more pre-stored location records.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3C are flowcharts of processes for enabling the generation of a location record at a device based on a location not associated with a pre-stored location record, according to various embodiments;

FIG. 4B is a diagram depicting the storing of a location record, according to one embodiment;

DESCRIPTION OF SOME EMBODIMENTS

Examples of a method, apparatus, and computer program for enabling the generation of a location record at a device based on a location not associated with a pre-stored location record are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
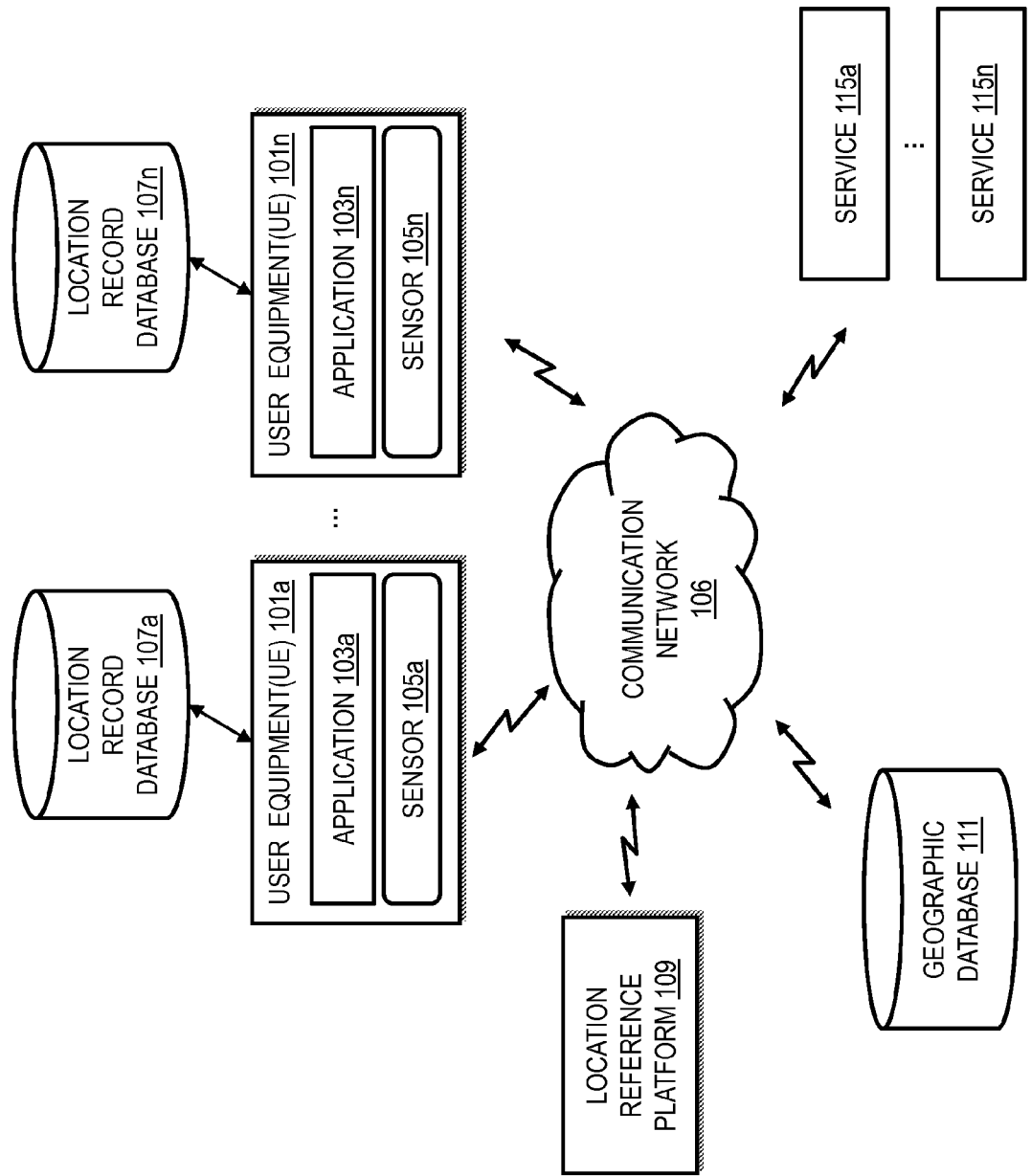
FIG. 1 is a diagram of a system for enabling the generation of a location record at a device based on a location not associated with a pre-stored location record, according to one embodiment.

FIG. 1 is a diagram of a system for enabling the generation of a location record at a device based on a location not associated with a pre-stored location record, according to one embodiment. By way of example, a location reference platform 109 is configured to interact with user equipment (UE) 101a-101n, such as a mobile phone, tablet device, desktop computer, set-top box, radio receiver, or any other device capable of storing and/or processing location based data. The location based data may include traffic information, route information (e.g., directions, navigation routes), travel related event information (e.g., accidents, road conditions, weather conditions), map information, or the like. The location based data may be received at the UE 101a-101n from one or more location based services 115a-115n according to various formats. Hence, as noted previously, the UE 101a-101n must be configured to interpret the location based data as received properly to enable rendering of the information correctly.

By way of example, the UE 101a-101n (referred to herein collectively as UE 101) may be a radio receiver device configured within an automobile. Under this scenario, radio receiver device may access a traffic information service 115a-115n (referred to herein collectively as services 115) to receive location based data regarding an adverse road condition occurring along or near a stretch of road the automobile is traveling. The service 115 may transmit the location according to various formats, including a Radio Data System (RDS) format, a HD radio signal format, a digital audio broadcasting (DAB) format, or any other communications protocol for embedding/encoding the location based data as digital information per the radio broadcast. As such, the location based data may be binary-encoded traffic message channel (TMC) data. In addition, the location based data may include map information, point-of-interest information and other data as maintained via a geographic database 111 corresponding to various locations. It is noted the UE 101, which in this scenario is a radio receiver device, may also be configured with an application 103a-103n or module (referred to herein collectively as applications 103) for communicating with services 115 and for processing the location based data.

The radio receiver device is able to interpret which road, intersection, region or other specific location the location based data pertains to by way of one or more pre-loaded location records. Typically, the records are pre-loaded onto the device by the manufacturer or as a result of installation of the corresponding location based application 103. Each location record further specifies a location code for referencing a respective geo-location and/or geo-position—i.e., a total of 65,536 TMC location codes. Hence, as the location of the radio receiver device varies over time or during the course of travel, the particular location record and corresponding code for referencing the location will vary accordingly. Unfortunately, however, there is currently no convenient means of enabling the UE 101 to provide location based data regarding locations that are not already referenced by a specific location code.

To address this problem, a system 100 of FIG. 1 introduces the capability to generate location records "on-the-fly" in response to the determination a location of the UE 101 does not correspond to a particular location record. By way of example, when a specific location (e.g., current location) of the UE 101 is not referenced by a particular location code within a location record, the location reference platform 109 enables generation of a location record that includes the unassigned location. Under this approach, a user of the UE 101 to which the location records are pre-stored is able to adapt the location records accordingly to accommodate new or previously undefined locations. This action may be performed, for instance, when the user of the UE 101 is travelling along a newly developed street that has yet to be associated with a specific location code. In other instances, this action may be performed based on a discrepancy between a location code and a location of the UE 101 (e.g., improper location code reference to a particular road). While various examples may apply, it is noted the location reference platform 109 may be adapted to generate and subsequently store the generated location record automatically, with limited user intervention, to accommodate the unknown/unassigned location.

By way of example, the location reference platform 109 is configured to operate in connection with the UE 101, which may be any type of mobile terminal, fixed terminal, or portable terminal. This may include, for example, a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.) as well as support the rendering of location based data via a display.

The location reference platform 109 may interface with the UE 101 by way of a communication network 106. Per this implementation, the location reference platform 109 may be a network based application, cloud solution or hosted solution of the UE 101. The location records may be accessed from a network data store containing one or more location records and/or via a geographic database 111 that serves as a repository of location based data. Alternatively, the location reference platform 109 may operate directly at UE 101 and be initiated for execution via an application 103 of the UE 101 accordingly. Per this scenario, the location reference platform 109 may execute various application programming interfaces (APIs) for accessing the pre-stored location records 107. It is noted that the application 103 may include, for example, a navigation application, a traffic reporting application, a radio broadcasting application or any other location based application interacting with one or more location based services 115.

In certain embodiments, the location reference platform 109 performs a look-up procedure against a location record database 107a-107n (referred to herein collectively as location record database 107) to determine if a location code specified within a location record corresponds to captured location and/or position information. The lookup procedure, which may be performed by way of any known data mining or data retrieval techniques, may be performed as a local UE 101 procedure in the case where the location records are local. Alternatively, in the case where the location record database 107 is remotely accessed by the UE 101 (i.e., maintained as part of a geographic database 111), the lookup procedure is performed remotely.

For the purpose of illustration herein, the exemplary embodiments contemplate local storage of the location records. As such, the location records are pre-stored at the UE 101 accordingly, thus enabling the location records to be retrieved by the application 103 of the UE 101 or in response to the receipt of location based data via a service 115. In addition to location code and geo-position information, respective records may also reference geo-location information, name information and other details pertaining to the specific location. The location record may correspond to a data structure of various sizes for encoding the code and other information.

When the lookup procedure at the database 107 results in a location code being found for the location, the corresponding geo-position information and other attributes (e.g., geo-location coordinates) are retrieved for use in connection with the service 115 and/or the application 103. When the lookup procedure results in no location code being found, however, the location reference platform 109 generates a location record for the corresponding location. In certain embodiments, the platform 109 retrieves an unassigned location code from the location record database 107. The unassigned location codes may include those that have been reserved for use in connection with the location reference platform 109 for on-the-fly location record generation. In addition, the unassigned location codes include those that have yet to be associated with a specific set of geo-position, geo-location and other location based data. Once retrieved, the platform 109 then associates the location code with the geo-position and geo-location information pertaining to the location. Still further, the platform 109 causes transmission of the location record as generated to the UE 101 for storage to the location record database 107. As such, the newly generated location record is made available for use in connection with the corresponding service 115 and/or application 103 for enabling the processing of any received location based data.

In certain embodiments, the location reference platform 109 determines a current location of the UE 101, wherein the current location may be the basis for generation of a location record. By way of example, the platform 109 may process location information, position information, orientation information, temporal information and other context information regarding a UE 101 by way of sensors 105a-105n (referred to herein collectively as sensors 105) of the UE 101. As such, the platform 109 is able to deduce the specific geo-location coordinates (e.g., latitude and longitude) for the location. In addition, geo-position information regarding the location may also be determined, including determining a bearing or direction of movement of the UE 101 relative to the given location. It is noted, in the case where the UE 101 is in motion about a given location that an offset location (e.g., secondary location) and offset position (e.g., secondary position) is determined and subsequently associated with the first determined location and position. This enables the location reference platform 109 to account for references to locations that may extent through several adjacent other areas, roads, etc. In addition, changes in bearing may also be determined accordingly for affecting the generation of a location record.

In certain embodiments, the location reference platform 109 is configured to receiver a user input for indicating a selection of a permanent or temporary storing of a generated location record. By way of example, when a location record is generated for a previously unassigned location, the location reference platform 109 may render a notification message to the display of the UE 101. The notification message may specify a location record has been generated (as a result of no association of the location with a record) as well as user selection options for storing the record permanently. When the user opts to store the location record permanently, the newly generated record is stored with the other location records via the database 107. This enables the record to be readily available for subsequent use in connection with the same location. In the case where the user opts not to permanently store the location record, this newly generated location record is used temporarily. As such, the location record is enabled for use in connection with the application 103 and/or service 115 for a limited time—i.e., as long as the location coordinates for the UE 101 correspond to that indicated within the newly generated location record.

In certain embodiments, the location reference platform 109 also enables updating of a previously generated location record. By way of example, when a location record is retrieved in connection with a location of the UE 101 in error (e.g., the location specified is incorrect); the user may specify that the location reference is invalid. Under this scenario, when a UE 101 current location is I-94 bearing west but the location based information presented indicates I-90 bearing west; this indicates to the user that the current course and location of the UE 101 was not properly designated and/or interpreted. The user of the UE 101 may flag this error, for example, by selecting a link or action button as presented in connection with the location based data as rendering to a display of the UE 101. It is noted that the application 103 may employ various APIs for enabling the application 103 to interact with the location reference platform 109. The location record associated with the flag may then be updated by the user to correspond to a different location or deleted in its entirety.

As shown in FIG. 1, the system 100 comprises user equipment (UE) 101 having connectivity to the location based services 115 via a communication network 106. By way of example, the communication network 106 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (EMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UE 101, location reference platform 109, applications 103 and services 115 communicate with each other and other components of the communication network 106 using well known, new or still developing protocols. In this context, a protocol includes a set of rules defining how the network nodes within the communication network 106 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
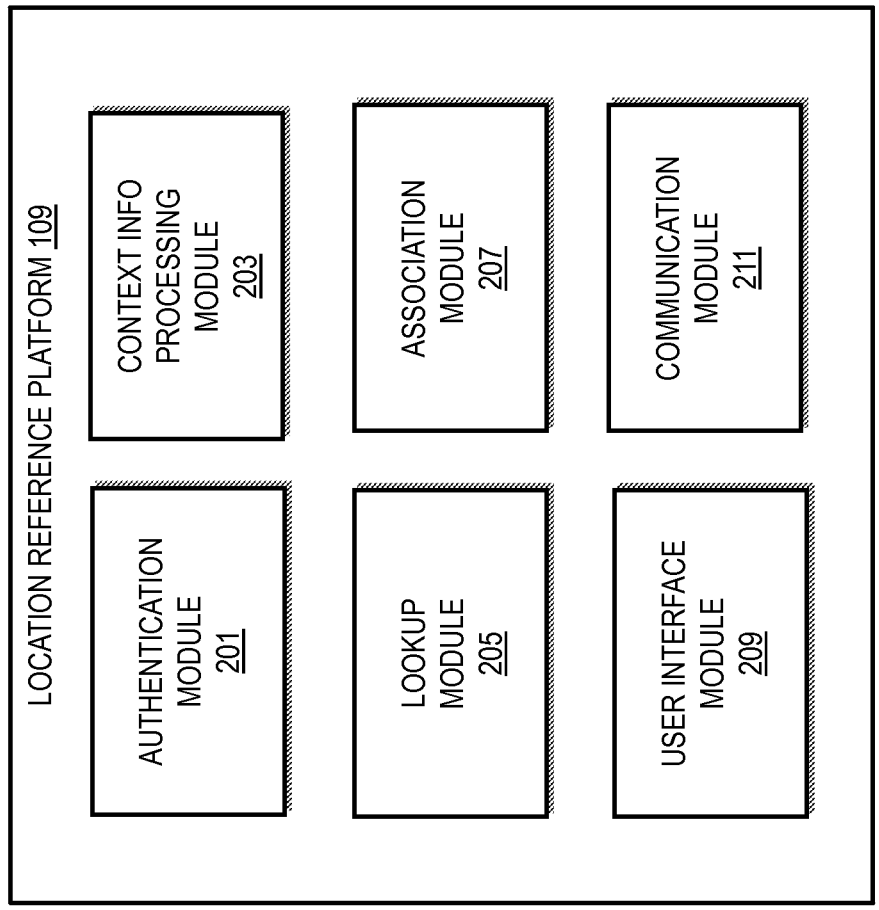
FIG. 2 is a diagram of the components of a location reference platform, according to one embodiment.

FIG. 2 is a diagram of the components of a location reference platform, according to one embodiment. By way of example, the location reference platform 109 includes one or more components for enabling generation of a location record at a device based on a location not associated with a pre-stored location record. It is contemplated the functions of these components may be combined in one or more components or performed by other components of equivalent functionality. In this embodiment, the location reference platform 109 includes an authentication module 201, context information processing module 203, lookup module 205, association module 207, user interface module 209 and communication module 211.

In one embodiment, an authentication module 201 authenticates users and UE 101a-101 n for interaction with the location reference platform 109. This may include, for example, receiving a user input for enabling activation of the platform 109 at the UE 101. Alternatively, in the case where the location based platform 109 is accessed remotely by the UE, the authentication module 201 may facilitate an initial subscription procedure. During the subscription, the user of the UE 101 may "opt-in" to permit the sharing of context information (e.g., location information, position information and temporal information) as collected via one or more sensors 105 of UE 101.

The authentication process performed by the module 201 may also include receiving and validating a login name and/or user identification value as provided or established for a particular user during a subscription or registration process with a provider of the location reference platform 109. The login name and/or user identification value may be received as input provided by the user from the user device 101 or other device via a graphical user interface to the location reference platform 109 (e.g., as enabled by user interface module 209). Profile data pursuant to registration may be cross referenced as part of the login process. Alternatively, the login process may be performed through automated association of profile settings maintained as profile data with an IP address, a carrier detection signal of a user device, mobile directory number (MDN), subscriber identity module (SIM) (e.g., of a SIM card), radio frequency identifier (RFID) tag or other identifier.

In one embodiment, the lookup module 205 performs a lookup procedure or query against the location record database 107 to determine if a location record can be identified to match location information associated with the UE 101. By way of example, the location information as processed via the context information processing module 203 is passed to the lookup module 205 as a query variable. The lookup module then attempts to identify and/or retrieve a location record having a location code that corresponds to the captured location. In the case where no match can be determined, the lookup module 205 activates the association module 207. It is noted that the lookup module 205 may perform the query according to any known data mining or data retrieval techniques.

In one embodiment, the context information processing module 203 receives context information as gathered by the sensors 105 of respective UE 101a-101n. Once received, the context information processing module 203 analyzes the context information 113 to determine the relative geo-location coordinates, time, geo-position and other information useful for identifying a corresponding location record for said location. Based on this determination, the context information processing module 203 triggers execution of the lookup module 205, which facilitates the querying/retrieval of the associated location record if it exists.

In one embodiment, the association module 207 facilitates the generation of a location record with a specific location of the UE 101. By way of example, the association module 207 is triggered to generate the record in the instance no existing location record is identified. The association module 207 retrieves an unassigned location code from the location record database 107. Once retrieved, the module 207 then associates the location code with the geo-position and geo-location information as determined (via the context processing module 203) for the location. Still further, the module 207 causes transmission of the location record as generated to the UE 101 for storage to the location record database 107. This transmission may be performed in connection with the communication module 211, which is adapted to facilitate either local or remote exchange of the location record.

In one embodiment the user interface module 209 enables presentment of a graphical user interface for presenting notification messages regarding the generation of a location record. In addition, the user interface module 209 enables the presentment of one or more user selection option buttons or links for choosing permanent storing of the location record or temporary use. By way of example, the user interface module 209 employs various application programming interfaces (APIs) or other function calls corresponding to the application 103 of UE 101; thus enabling the display of graphics primitives such as menus, buttons, data entry fields, etc.

The above presented modules and components of the location reference platform 109 can be implemented in hardware, firmware, software, or a combination thereof. Though depicted as a separate entity in FIG. 1, it is contemplated that the location reference platform 109 may be implemented for direct operation by respective UE 101. As such, the location reference platform 109 generates direct signal inputs by way of the operating system of the UE 101 for interacting with the application 107. In another embodiment, one or more of the modules 201-211 may be implemented for direct operation with a service or application of the UE 101, such as in the form of a widget, applet or add on component. The various executions presented herein contemplate any and all arrangements and models.

Figure 3C:
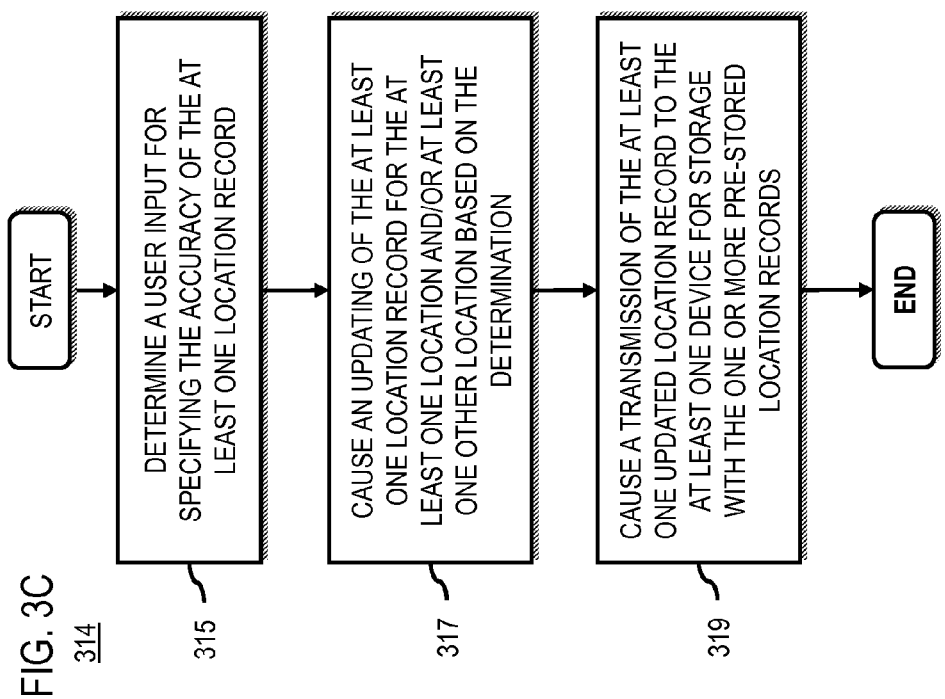
Figure 6:
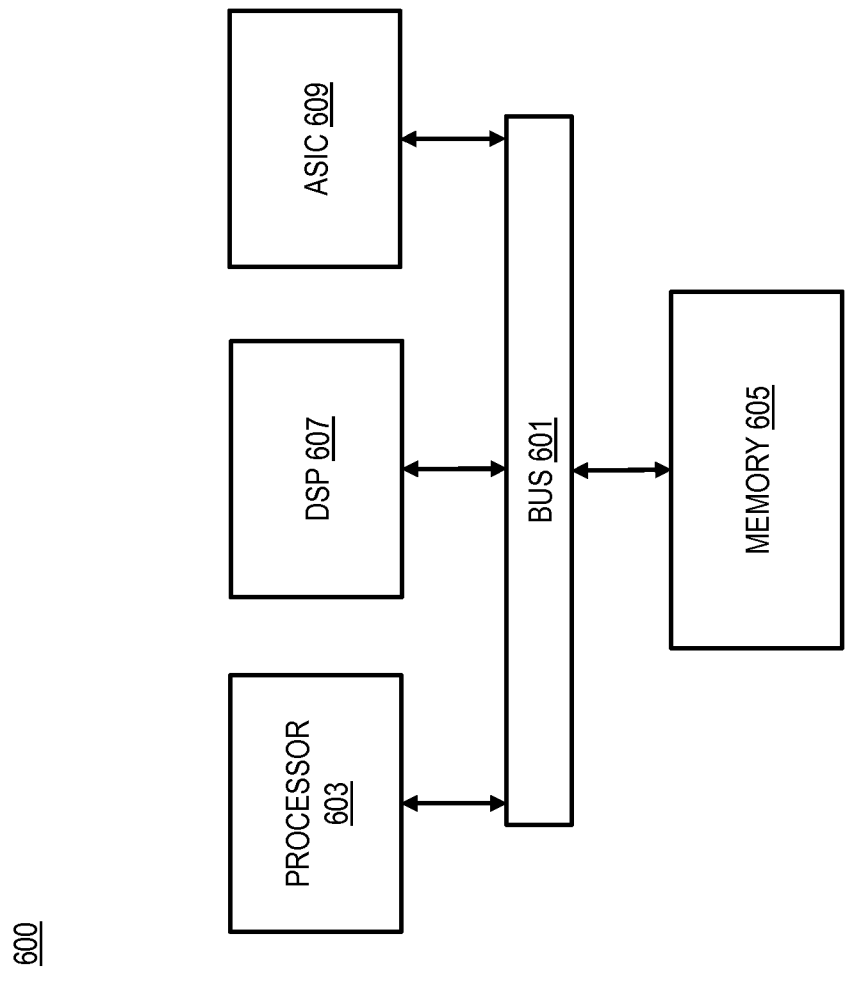
FIG. 6 is a diagram of a chip set that can be used to implement an embodiment of the invention.

FIGS. 3A-3C are flowcharts of processes for enabling the generation of a location record at a device based on a location not associated with a pre-stored location record, according to various embodiments. In one embodiment, the location reference platform 109 performs processes 300, 308 and 314. Also, the location reference platform 109 may be implemented in, for instance, a chip set including a processor and a memory as shown in FIG. 6.

In step 301 of process 300 (FIG. 3A), the location reference platform 109 determines at least one location is not associated with one or more pre-stored location records at at least one device. As noted, the at least one location may correspond to a current location of the UE 101, such as in the case of the UE 101 being used in connection with the travel or movement of a user. In another step 303, the platform 109 determines at least one unused location code to associate with the at least one location record.

In another step 305, the platform 109 causes, at least in part, a generation of at least one location record for the at least one location, wherein the at least one location record includes at least in part a location code and geo-position information associated with the at least one location. As noted previously, the at least one location record includes at least in part a location code and geo-position information associated with the at least one location.

In another step 307, the location reference platform 109 causes, at least in part, a transmission of the at least one location record to the at least one device for storage with the one or more pre-stored location records. The one or more pre-stored location records, the at least one location record, or a combination thereof includes, at least in part, one or more traffic message channel (TMC) records. Hence, as such, the location records may be generated according to a known location record specification, with certain of the corresponding location codes being retained for use in generating location records on-the-fly.

In step 309 of process 308 (FIG. 3B), the location reference platform 109 determines a user input for selection of a permanent storage of the at least one location record with the one or more pre-stored location records. Per step 311, the platform 109 determines a user input for selection of a temporary usage of the at least one location record. As noted, the user input for selection of permanent or temporary use of the location record as generated may be received by way of a user interface as rendered to a display of the UE 101.

In step 313, the location reference platform 109 processes and/or facilitates a processing of location information, position information corresponding to the location, or a combination thereof associated with the at least one device to determine a match with the at least one location. As noted above, the wherein the match is based on a lookup procedure associated with the one or more pre-stored location records. Also, as mentioned, the location information includes at least one location and at least one offset location from the at least one location and the position information includes at least one position and at least one offset position from the at least one secondary position.

In step 315 of process 314 (FIG. 3C), the location reference platform 109 determines a user input for specifying the accuracy of the at least one location record. In another step 317, the platform 109 causes, at least in part, an updating of the at least one location record for the at least one location, at least one other location, or a combination thereof based, at least in part, on the determination. Per step 319, the platform 109 causes, at least in part, a transmission of the at least one updated location record to the at least one device for storage with the one or more pre-stored location records.

Figure 4A:
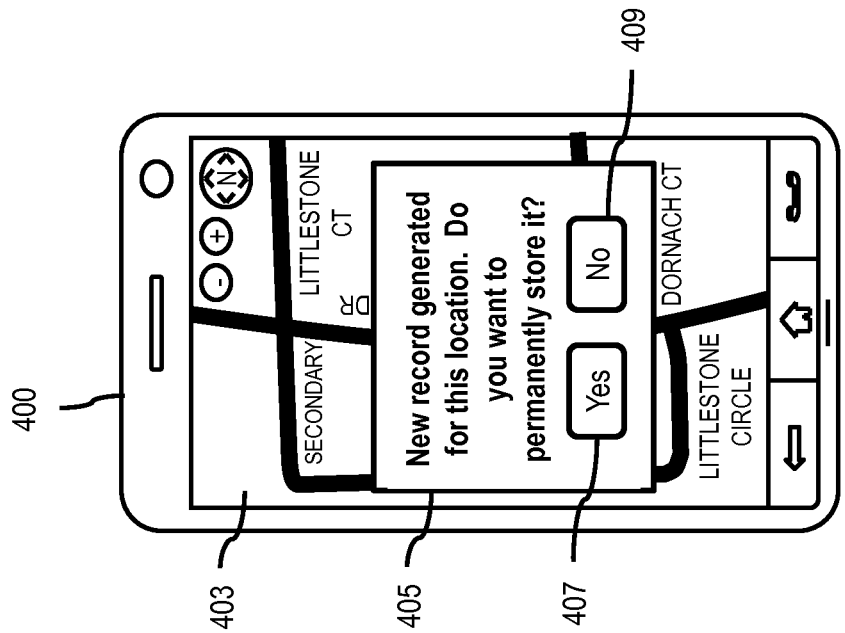
FIG. 4A is a diagram of a user interface utilized in the processes of FIGS. 3A-3C, according to one embodiment.

It is noted that the location reference platform 109 overcomes limitations associated with pre-stored location records that are not able to be adapted for locations that are not already associated with a pre-stored location record. By way of the location reference platform 109, a newly generated location record may be employed for use in connection with a location-based service, a traffic information system, or a combination thereof associated with the at least one device FIG. 4A is a diagram of a user interface utilized in the processes of FIGS. 3A-3C, according to one embodiment. For the purpose of illustration, the diagram is described with respect to an exemplary use case of a user interacting with the location reference platform 109 via a mobile device 400. In this example, the location reference platform 109 generates a notification message 405 for presentment during execution of a navigation application 403 of the device 400.

In FIG. 4A, the notification message 405 is presented in response to a generation of location record for the location (current) of the device 400. Generation of the location record is triggered based on a determination by the location reference platform 109 that no pre-stored location record exists for the location. As a result, the location reference platform 109 initiates generation of a new location record, including the associating of a reserved/unassigned location code with geo-position information corresponding to the device 400. Once this record is generated, the platform 109 causes a rendering of the message 405 to the display of the device 400 for receiving a user input to opt for permanent storage of the location record. In this scenario, the user is presented with a Yes action button 407 for opting to permanently store the location record. Alternatively, the user may select a No action button 409 for enabling only temporary use of the location record.

FIG. 4B is a diagram depicting the storing of a location record, according to one embodiment. By way of example, the diagram depicts the storing of the newly generated location record 431 along with other pre-stored location records 421. While depicted for the purpose of illustration in a tabular format, it is noted that various other data structures and file formats may be employed for storing of the location records. Transmission of the location record as generated corresponds to the permanent storing of the location record, i.e., as based on user selection of the Yes action button 407 per FIG. 4A.

The location records 421 and 431 may include, for example, data for indicating the location code along with the associated road number and location name, corresponding to data columns 422, 423 and 425 respectively. In addition, the location record may specify geo-position information for indicating a location bearing along with geo-location information corresponding to the location per data columns 427 and 429 respectively.

In the case of the newly generated location record 431, it is assigned a different unique location code reference. In addition, the location record will specify geo-position and geo-location information corresponding to that captured with respect to the sensors of the device 400. Hence, the newly generated location record 431 is available for future reference in connection with the device 400 being present at the corresponding location.

The processes described herein for enabling the generation of a location record at a device based on a location not associated with a pre-stored location record may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
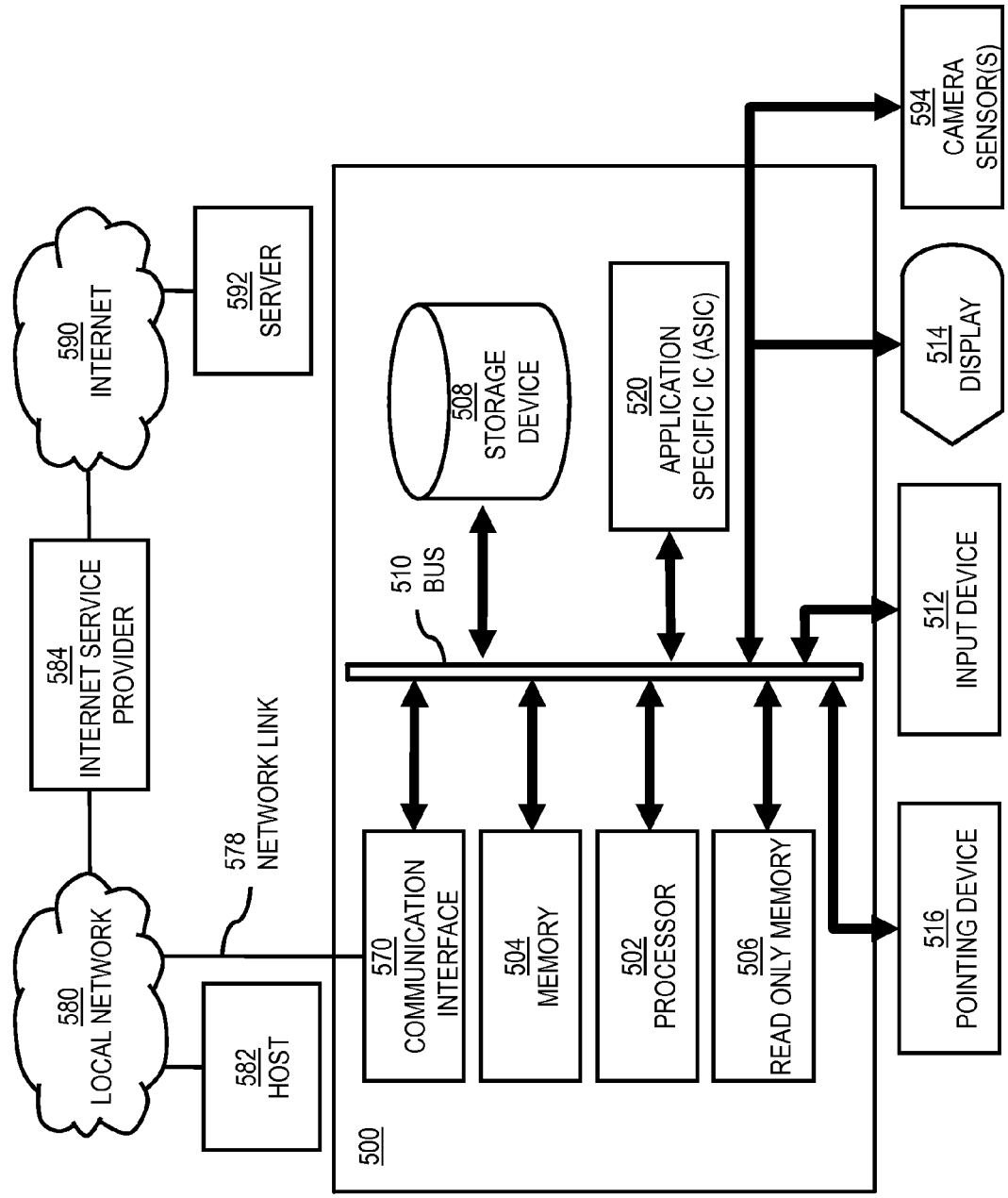
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to enable the generation of a location record at a device based on a location not associated with a pre-stored location record as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of enabling the generation of a location record at a device based on a location not associated with a pre-stored location record.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to enable the generation of a location record at a device based on a location not associated with a pre-stored location record. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for enabling the generation of a location record at a device based on a location not associated with a pre-stored location record. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for enabling the generation of a location record at a device based on a location not associated with a pre-stored location record, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 106 for enabling the generation of a location record at a device based on a location not associated with a pre-stored location record to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to enable the generation of a location record at a device based on a location not associated with a pre-stored location record as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of enabling the generation of a location record at a device based on a location not associated with a pre-stored location record.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable the generation of a location record at a device based on a location not associated with a pre-stored location record. The memory 605 also stores the data associated with or generated by the execution of the inventive steps.

Figure 7:
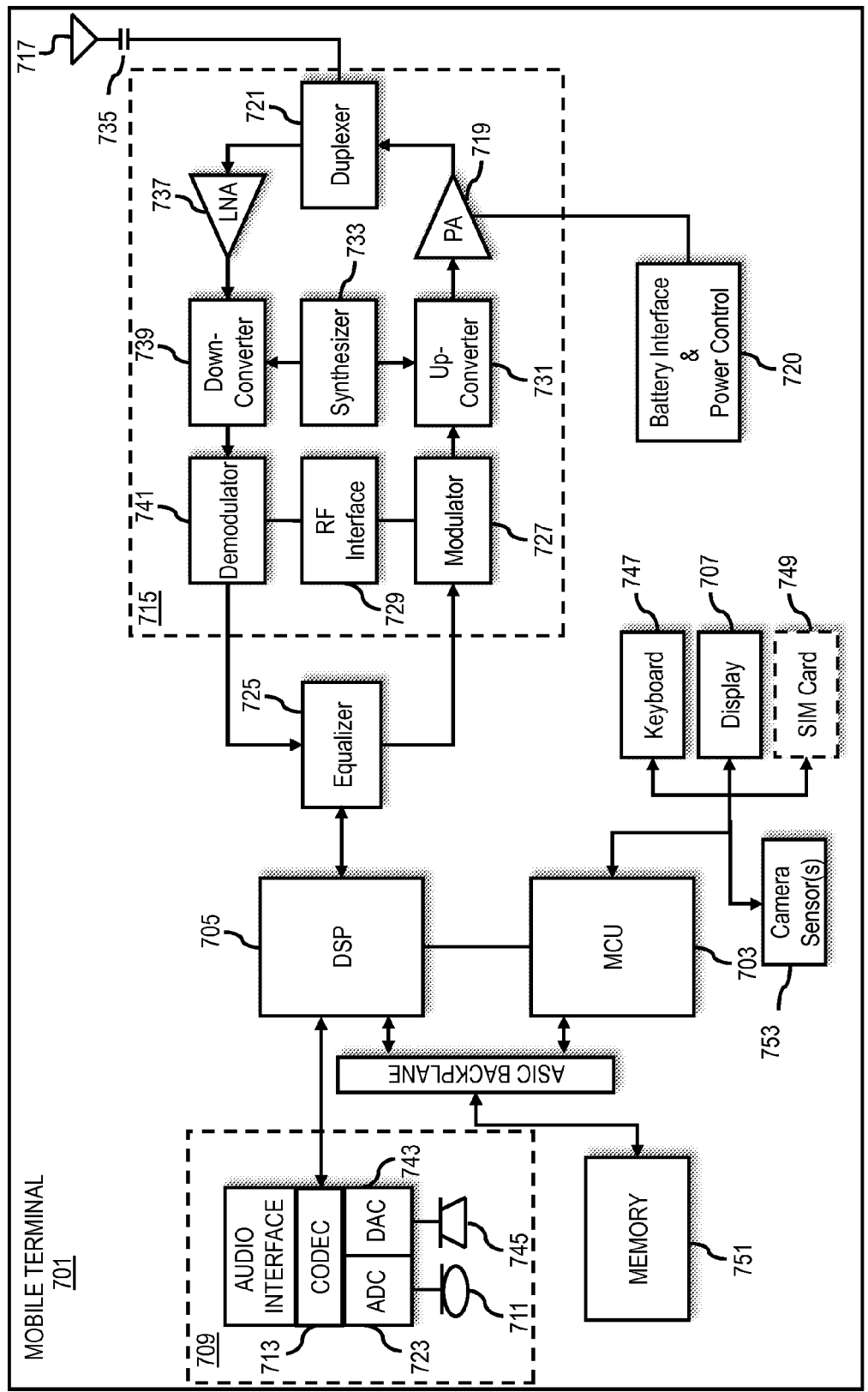
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of enabling the generation of a location record at a device based on a location not associated with a pre-stored location record. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of enabling the generation of a location record at a device based on a location not associated with a pre-stored location record. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to enable the generation of a location record at a device based on a location not associated with a pre-stored location record. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    at least one determination that at least one location is not included in one or more pre-stored location records at at least one device, wherein the at least one location is present geo-position information associated with the at least one device;
    a generation of at least one location record for the at least one location, wherein the at least one location record includes at least in part a location code and the present geo-position information; and
    a transmission of the at least one location record to the at least one device for storage with the one or more pre-stored location records.

2. A method of claim 1, wherein the one or more pre-stored location records, the at least one location record, or a combination thereof includes, at least in part, one or more traffic message channel (TMC) records.

3. A method of claim 1, wherein the (1) data and/or (2) information and/or (3) at least one signal are further based, at least in part, on the following:
    a user input for selection of a permanent storage of the at least one location record with the one or more pre-stored location records.

4. A method of claim 1, wherein the (1) data and/or (2) information and/or (3) at least one signal are further based, at least in part, on the following:
    a user input for selection of a temporary usage of the at least one location record.

5. A method of claim 4, wherein the (1) data and/or (2) information and/or (3) at least one signal are further based, at least in part, on the following:
    a processing of location information, position information corresponding to the location, or a combination thereof associated with the at least one device to determine a match with the at least one location,
    wherein the location information includes at least one location and at least one offset location from the at least one location and the position information includes at least one position and at least one offset position from at least one secondary position.

6. A method of claim 5, wherein the match is based on a lookup procedure associated with the one or more pre-stored location records.

7. A method of claim 1, wherein the (1) data and/or (2) information and/or (3) at least one signal are further based, at least in part, on the following:
    at least one determination of at least one unused location code to associate with the at least one location record, wherein the at least one unused location code is reserved for generation of the at least one location record.

8. A method of claim 1, wherein the (1) data and/or (2) information and/or (3) at least one signal are further based, at least in part, on the following:
    a user input for specifying the accuracy of the at least one location record; and
    an updating of the at least one location record for the at least one location, at least one other location, or a combination thereof based, at least in part, on the determination.

9. A method of claim 1, wherein the (1) data and/or (2) information and/or (3) at least one signal are further based, at least in part, on the following:
    a transmission of the at least one updated location record to the at least one device for storage with the one or more pre-stored location records.

10. A method of claim 1, wherein the at least one location record, the one or more pre-stored location records, or a combination thereof are used by a location-based service, a traffic information system, or a combination thereof associated with the at least one device.

11. A method of claim 1, wherein a user input is received via a generation of at least one notification message and a presenting of the at least one notification message that the at least one location is not included in the one or more pre-stored location records at at least one device.

12. An apparatus comprising:
    at least one processor; and
    at least one memory including computer program code for one or more programs,
    the at least one memory and the computer program code configured to, with the at least one processor, cause the apparatus to perform at least the following,
    determine that at least one location is not included in one or more pre-stored location records at at least one device, wherein the at least one location is present geo-position information associated with the at least one device;
    cause, at least in part, a generation of at least one location record for the at least one location, wherein the at least one location record includes at least in part a location code and the present geo-position information; and
    cause, at least in part, a transmission of the at least one location record to the at least one device for storage with the one or more pre-stored location records.

13. An apparatus of claim 12, wherein the one or more pre-stored location records, the at least one location record, or a combination thereof includes, at least in part, one or more traffic message channel (TMC) records.

14. An apparatus of claim 12, wherein the apparatus is further caused to:

determine a user input for selection of a permanent storage of the at least one location record with the one or more pre-stored location records.

15. An apparatus of claim 12, wherein the apparatus is further caused to:
determine a user input for selection of a temporary usage of the at least one location record.

16. An apparatus of claim 15, wherein the apparatus is further caused to:
process and/or facilitate a processing of location information, position information corresponding to the location, or a combination thereof associated with the at least one device to determine a match with the at least one location,
wherein the location information includes at least one location and at least one offset location from the at least one location and the position information includes at least one position and at least one offset position from at least one secondary position.

17. An apparatus of claim 16, wherein the match is based on a lookup procedure associated with the one or more pre-stored location records.

18. An apparatus of claim 12, wherein the apparatus is further caused to:
determine at least one unused location code to associate with the at least one location record,
wherein the at least one unused location code is reserved for generation of the at least one location record.

19. An apparatus of claim 12, wherein the apparatus is further caused to:
determine a user input for specifying the accuracy of the at least one location record; and
cause, at least in part, an updating of the at least one location record for the at least one location, at least one other location, or a combination thereof based, at least in part, on the determination.

20. An apparatus of claim 19, wherein the apparatus is further caused to:
cause, at least in part, a transmission of the at least one updated location record to the at least one device for storage with the one or more pre-stored location records.

21. An apparatus of claim 12, wherein the at least one location record, the one or more pre-stored location records, or a combination thereof are used by a location-based service, a traffic information system, or a combination thereof associated with the at least one device.

* * * * *